(12) United States Patent
Samuel et al.

(10) Patent No.: US 10,480,249 B2
(45) Date of Patent: Nov. 19, 2019

(54) HYBRID MECHANICAL-LASER DRILLING EQUIPMENT

(71) Applicant: Halliburton Energy Services, Inc., Houston, TX (US)

(72) Inventors: Robello Samuel, Cypress, TX (US); Aniket, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 261 days.

(21) Appl. No.: 15/521,349

(22) PCT Filed: Nov. 26, 2014

(86) PCT No.: PCT/US2014/067611
§ 371 (c)(1),
(2) Date: Apr. 24, 2017

(87) PCT Pub. No.: WO2016/085490
PCT Pub. Date: Jun. 2, 2016

(65) Prior Publication Data
US 2017/0306703 A1    Oct. 26, 2017

(51) Int. Cl.
*E21B 7/15*    (2006.01)
*E21B 44/00*    (2006.01)
(Continued)

(52) U.S. Cl.
CPC ............... *E21B 7/15* (2013.01); *E21B 7/14* (2013.01); *E21B 10/00* (2013.01); *E21B 10/08* (2013.01);
(Continued)

(58) Field of Classification Search
CPC .................................................. E21B 7/14–15
See application file for complete search history.

(56) References Cited

U.S. PATENT DOCUMENTS 3,977,478 A    8/1976    Shuck
4,066,138 A    1/1978    Salisbury et al.
(Continued)

FOREIGN PATENT DOCUMENTS

CN    102155196 A    8/2011
CN    203334954 U    12/2013
(Continued)

OTHER PUBLICATIONS

International Preliminary Report on Patentability issued in related Application No. PCT/US2014/067611, dated Jun. 8 2017 (12 pages).
(Continued)

*Primary Examiner* — William D Hutton, Jr.
*Assistant Examiner* — Steven A MacDonald
(74) *Attorney, Agent, or Firm* — Alan Bryson; Baker Botts L.L.P.

(57) ABSTRACT

Systems and methods for utilizing hybrid mechanical-laser drilling tools, such as drill bits and hole-openers, are provided. Such drilling tools may include mechanical cutters in addition to laser cutting mechanisms designed to focus laser beams toward a subterranean formation. The mechanical cutters and laser cutting mechanisms may work in combination to advance a wellbore through the subterranean formation. The drilling tools may be controlled to vary the amount of energy output through the mechanical drilling via the cutters and through the laser-assisted drilling via the lasers.

19 Claims, 5 Drawing Sheets

(51) Int. Cl.
*E21B 7/14* (2006.01)
*E21B 10/00* (2006.01)
*E21B 10/08* (2006.01)
*E21B 10/42* (2006.01)
*E21B 10/567* (2006.01)
*E21B 49/00* (2006.01)
*E21B 10/26* (2006.01)
*B23K 26/00* (2014.01)
*E21B 47/12* (2012.01)

(52) U.S. Cl.
CPC .............. *E21B 10/26* (2013.01); *E21B 10/42* (2013.01); *E21B 10/567* (2013.01); *E21B 44/00* (2013.01); *E21B 49/00* (2013.01); *E21B 49/003* (2013.01); *B23K 26/0093* (2013.01); *E21B 47/12* (2013.01)

(56) References Cited

U.S. PATENT DOCUMENTS

| | | | |
|---|---|---|---|
| 4,090,572 | A | 5/1978 | Welch |
| 4,113,036 | A | 9/1978 | Stout |
| 4,227,582 | A | 10/1980 | Price |
| 6,308,787 | B1 | 10/2001 | Alft |
| 6,626,249 | B2 | 9/2003 | Rosa |
| 6,892,812 | B2 | 5/2005 | Niedermayr et al. |
| 7,086,484 | B2 | 8/2006 | Smith, Jr. |
| 7,147,064 | B2 | 12/2006 | Batarseh et al. |
| 7,416,258 | B2 | 8/2008 | Reed et al. |
| 8,109,345 | B2 | 2/2012 | Jeffryes |
| 8,210,283 | B1* | 7/2012 | Benson ............... E21B 7/04 175/61 |
| 8,307,900 | B2 | 11/2012 | Lynde et al. |
| 8,424,617 | B2 | 4/2013 | Faircloth et al. |
| 8,464,794 | B2 | 6/2013 | Schultz et al. |
| 8,511,401 | B2 | 8/2013 | Zediker et al. |
| 8,571,368 | B2 | 10/2013 | Rinzler et al. |
| 8,627,901 | B1 | 1/2014 | Underwood et al. |
| 8,636,085 | B2 | 1/2014 | Rinzler et al. |
| 8,701,794 | B2 | 4/2014 | Zediker et al. |
| 2003/0221873 | A1* | 12/2003 | Beaton ............... E21B 10/26 175/385 |
| 2008/0156531 | A1 | 7/2008 | Boone et al. |
| 2008/0164062 | A1* | 7/2008 | Brackin ............... E21B 21/103 175/24 |
| 2008/0245568 | A1 | 10/2008 | Jeffryes |
| 2010/0078414 | A1 | 4/2010 | Perry et al. |
| 2011/0278270 | A1 | 11/2011 | Braga et al. |
| 2012/0118568 | A1 | 5/2012 | Kleefisch et al. |
| 2012/0248078 | A1 | 10/2012 | Zediker et al. |
| 2012/0255774 | A1* | 10/2012 | Grubb ............... E21B 7/14 175/16 |
| 2012/0267168 | A1 | 10/2012 | Grubb et al. |
| 2012/0273470 | A1 | 11/2012 | Zediker et al. |
| 2013/0112478 | A1 | 5/2013 | Braga et al. |
| 2013/0228372 | A1 | 9/2013 | Linyaev et al. |
| 2014/0027178 | A1* | 1/2014 | Jeffryes ............... E21B 7/10 175/45 |
| 2014/0182933 | A1 | 7/2014 | Skinner et al. |
| 2014/0351183 | A1* | 11/2014 | Germain ............ G06F 17/5009 706/12 |
| 2016/0024847 | A1* | 1/2016 | Benson ............... E21B 7/06 175/24 |

FOREIGN PATENT DOCUMENTS

| | | |
|---|---|---|
| EP | 2388433 A1 | 11/2011 |
| EP | 2592215 A1 | 5/2013 |
| WO | 2010036318 A1 | 4/2010 |
| WO | 2010060177 A1 | 6/2010 |
| WO | 2010096086 A1 | 8/2010 |

OTHER PUBLICATIONS

Ketata, Chefi, Mysore G. Satish, and M. Rafiqul Islam. "Expert system knowledge management for laser drilling in the oil and gas industry." Computational Intelligence for Modelling, Control and Automation, 2005 and International Conference on Intelligent Agents, Web Technologies and Internet Commerce, International Conference on. vol. 1. IEEE, 2005.

Bazargan, Mohsen, et al. "Feasibility of Using Laser Bit Beside of Common Bits to Drilling Slim Holes." IPTC 2013: International Petroleum Technology Conference. 2013.

Sharma, Nitin, Ananth Srinivasan, and James Albert Hood. "Case Histories: Real-Time Downhole Data Increase Drilling Efficiency." North Africa Technical Conference and Exhibition. Society of Petroleum Engineers, 2010.

ZerLux Hungary KFT Website, "Laser Drilled Laterals" found at http://www.zerlux.com/products/laser-drilled-laterals, 1 page.

APS Tech Brochure Sure-Drill Optimizer Real-time Drilling Optimization found at http://www.aps-tech.com/documentation/technical-data-sheets/APS-TDS-SureDrill-Apps-Optimizer.pdf, 4 pages.

International Search Report and Written Opinion issued in related PCT Application No. PCT/US2014/067611 dated Jul. 30, 2015, 15 pages.

Extended European Search Report issued in related EP application No. 14906667.2, dated Mar. 26, 2018, 7 pages.

\* cited by examiner

HYBRID MECHANICAL-LASER DRILLING EQUIPMENT

CROSS-REFERENCE TO RELATED APPLICATION

The present application is a U.S. National Stage Application of International Application No. PCT/US2014/067611 filed Nov. 26, 2014, which is incorporated herein by reference in its entirety for all purposes.

TECHNICAL FIELD

The present disclosure relates generally to oil and gas well operations and, more particularly, to a systems and methods for drilling oil and gas wells using laser drilling equipment.

BACKGROUND

Hydrocarbons, such as oil and gas, are commonly obtained from subterranean formations that may be located onshore or offshore. The development of subterranean formations and the processes involved in removing hydrocarbons from a subterranean formation typically involve a number of different steps such as, for example, drilling a wellbore at a desired well site, treating the wellbore to optimize production of hydrocarbons, and performing the necessary steps to produce and process the hydrocarbons from the subterranean formation.

In conventional drilling operations, a drill bit is mounted in a bottom hole assembly (BHA) at the end of a drill string (e.g., drill pipe plus drill collars). At the surface a rotary drive turns the string, including the bit at the bottom of the hole, while drilling fluid (or "mud") is pumped through the string. Drill bits typically include cones and/or hardened inserts to mechanically contact and drill through the subterranean formation, thereby advancing the wellbore. Unfortunately, as drilling progresses the drill bit teeth tend to wear out, leading to reduced drilling efficiency, increased mechanical specific energy on the bit, and additional trips to replace the worn drill bit.

Some drilling methods utilize lasers that are designed to cut into, and advance a wellbore through, a subterranean formation that would cause undesirable wear on a mechanical drill bit. However, full scale field implementation of such laser-based well drilling techniques has not been feasible, due to the cost of providing energy to power a downhole laser drill bit. In addition, such laser drilling methods are generally applied only to drill bits and perforation devices.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Certain embodiments according to the present disclosure may be directed to systems and methods for utilizing mechanical-laser hybrid drilling tools, such as drill bits and hole-openers. Such drilling tools may include mechanical cutters in addition to laser cutting mechanisms designed to focus laser beams toward a subterranean formation. The mechanical cutters and laser cutting mechanisms may work in combination to advance a wellbore through the subterranean formation. The drilling tools may be controlled to vary the amount of energy output through the mechanical drilling via the cutters and through the laser-assisted drilling via the lasers.

The disclosed systems may include a controller designed to control the operation of the drilling tools, in order to provide a desired ratio or relative amount of energy output to the wellbore from the mechanical cutters and from the laser cutting mechanisms. The controller may perform an engineering analysis to determine the relative amount of energy output to the formation from the mechanical and laser components of the drilling tool. In some embodiments, the controller may perform the engineering analysis based on formation properties estimated during a planning stage before drilling the wellbore. In some embodiments, the controller may perform the engineering analysis throughout the drilling process using real-time or near real-time feedback from sensors used to track properties relating to the formation and the drilling operation. Such real-time and planning-stage analyses of the formation and drilling process may be used to control the mechanical-laser hybrid drilling in a manner that improves the overall drilling performance of the system. Thus, the disclosed drilling system and method may strategically combine the mechanical and laser features of the hybrid drilling tool to provide improved drilling performance, as compared to currently existing drilling tools.

Figure 1:
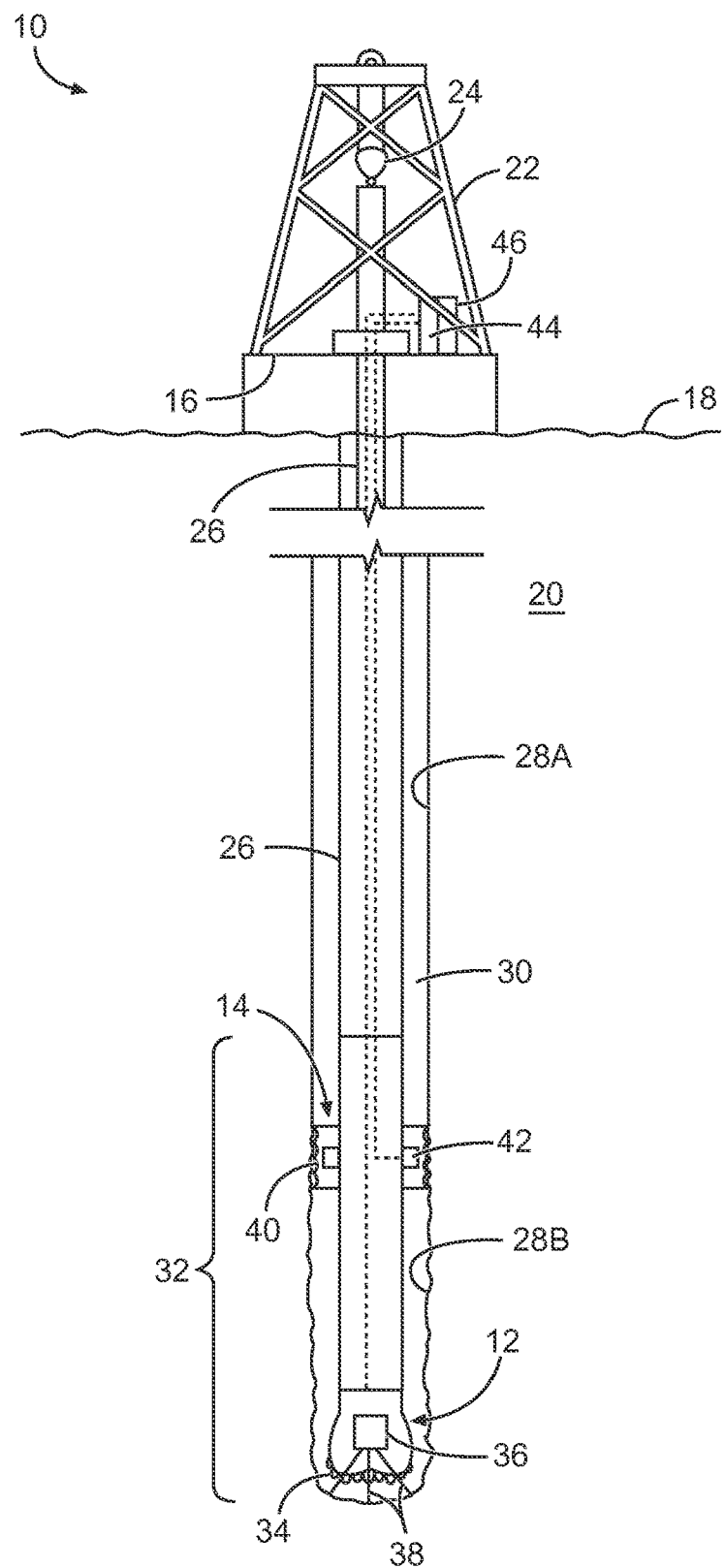
FIG. 1 is a schematic partial cross-sectional view of a wellbore drilling system in a wellbore environment, in accordance with an embodiment of the present disclosure.

Turning now to the drawings, FIG. 1 is a diagram of an example drilling system 10 incorporating a mechanical-laser hybrid drill bit 12 and a mechanical-laser hybrid hole-opener 14, in accordance with aspects of the present disclosure. The drilling system 10 may include a drilling platform 16 positioned at a surface 18. In the embodiment shown, the surface 18 includes the top of a subterranean formation 20 containing one or more rock strata or layers, and the drilling platform 16 may be in contact with the surface 18. In other embodiments, such as in an off-shore drilling operation, the surface 18 may be separated from the drilling platform 16 by a volume of water. A derrick 22 may be supported by the drilling platform 16 and have a traveling block 24 for raising and lowering a drill string 26 through a wellbore 28 created by the drill bit 12.

A pump may circulate drilling fluid through a feed pipe to a kelly, downhole through the interior of drill string 26, through orifices in the drill bit 12, back to the surface via an annulus 30 around the drill string 26, and into a retention pit. The drilling fluid transports cuttings from the wellbore 28 into the pit and aids in maintaining integrity or the wellbore 28.

The drilling system 10 may further include a bottom hole assembly (BHA) 32 coupled to the drill string 26 near the hybrid drill bit 12. The BHA 32 may include the hybrid drill bit 12, the hybrid hole-opener 14, as well as various downhole measurement tools and sensors, such as LWD/MWD tools, a telemetry system, and/or a downhole motor.

The hybrid drill bit 12 may be coupled to the drill string 26 and driven by a downhole motor and/or rotation of the drill string 26 by a rotary table and kelly, or by a top drive. The hybrid drill bit 12 may include mechanical cutters 34 for selectively applying mechanical force to the formation 20 to drill the wellbore 28 through the formation 20 in response to rotation of the bit as well as weight put on the bit from the drilling string components. In addition, the hybrid drill bit 12 may include at least one laser cutting mechanism 36 for selectively directing one or more laser beams 38 toward the formation 20 to drill the wellbore 28.

The hybrid drill bit 12 may be operated such that only the mechanical cutters 34 are used to drill the wellbore 28, only the laser cutting mechanism 36 is used to drill the wellbore 28, or a combination of the two are used to drill the wellbore 28. More specifically, the hybrid drill bit 12 may be operable in a mechanical mode where the mechanical cutters 34 alone are used to drill the wellbore and in a hybrid mode where both the mechanical cutters 34 and the laser cutting mechanism 36 are used to drill the wellbore 28. A controller may be communicatively coupled to the hybrid drill bit 12 to control operation of the hybrid drill bit 12 in the mechanical mode or in the hybrid mode. In some embodiments, the hybrid drill bit 12 may also be operable in a laser mode where the laser cutting mechanism 36 alone is used to drill the wellbore 28. Again, a controller communicatively coupled to the hybrid drill bit 12 may control operation of the hybrid drill bit 12 in the mechanical mode, the laser mode, or the hybrid mode. The mode of operation of the hybrid drill bit 12 may be adjustable throughout the drilling process to account for changes in formation properties as the depth of the wellbore 28 increases, as well as increasing dullness of the mechanical cutters 34.

As noted above, the illustrated drilling system 10 may include the hybrid hole-opener 14, located at a position above the hybrid drill bit 12. Instead of extending downwardly to impact and drill into a new portion of the formation 20, the hybrid hole-opener 14 may extend outward from a circumference of the drill string 26 or bottom hole assembly 32 to impact the side walls of the wellbore 28 already drilled by a bit. The hybrid hole-opener 14 may be utilized to smooth out the edges or walls of the wellbore 28 that is originally cut into the formation 20 via the drill bit 12. For example, as illustrated, a portion of the wellbore 28A that the hybrid hole-opener 14 has already passed features a relatively smooth profile, while a portion of the wellbore 28B that the hybrid hole-opener 14 has not yet reached may feature a more jagged and rough profile. In other applications, the hole-opener 14 may be utilized to enlarge the inner radius of the wellbore 28 that has initially been drilled via the drill bit 12.

The hybrid hole-opener 14 may include mechanical cutters 40 for selectively applying mechanical force to the formation 20 to shape or enlarge the wellbore 28 in response to rotation of the drill string 26 and/or BHA 32. In addition, the hybrid drill bit 12 may include at least one laser cutting mechanism 42 for selectively directing one or more laser beams toward the wall of the wellbore 28 to shape or enlarge the wellbore 28. The hybrid drill bit 12 may be operated such that only the mechanical cutters 40 are used to shape the wellbore 28, only the laser cutting mechanism 42 is used to shape the wellbore 28, or a combination of the two are used to shape the wellbore 28. This mode of operation of the hybrid drill bit 12 may be adjustable throughout the drilling process to account for changes in formation properties as the depth of the wellbore 28 increases, as well as increasing dullness of the mechanical cutters 40.

The mechanical cutters 34 and 40 of the hybrid drilling components (i.e., drill bit 12 and hole-opener 14, respectively) may cut through the formation 20 using mechanical force that is applied from the surface or from a downhole motor in the BHA 32. For example, a drawworks on the drilling platform 16 may be controlled to lower the traveling block 24, thereby applying a downward force through the drill string 26, the BHA 32, and ultimately the cutters 34 and 40 of the hybrid drilling components. In addition, a speed of rotation of the drill string 26 and/or the drill bit 12 (via a surface-level rotating device or a downhole motor in the BHA 32) may be controlled to change the amount of torque output from the mechanical cutters 34 and 40.

The laser cutting mechanisms 36 and 42 may receive power from a power supply 44 at the surface, as illustrated. The power may be supplied through hard-wired cables routed into the drill string 26, for example, from a top drive or kelly used to hoist and turn the drill string 26. In other embodiments, the laser cutting mechanisms 36 and 42 may receive power from a downhole power supply, for example, disposed in the BHA 32. The amount of energy provided from the power supply 44 to the laser cutting mechanisms 36 and 42 may be controlled to adjust the amount of power output to the formation 20 via the laser beams. The amount of power output via the laser beams, and/or the direction of laser beam output, may be controllable to adjust a ratio of energy output via the laser cutting mechanisms 36 and 42 to energy output via the corresponding mechanical cutters 34 and 40.

The hybrid drill bit 12 and/or the hybrid hole-opener 14 may be utilized in certain embodiments to form a desired type of wellbore 28. For example, the hybrid hole-opener 14 may be particularly suitable for use during formation of a monobore, which is a type of wellbore having the same diameter from the top down. Monobores are typically utilized in the formation of deep-water wells, for example. In other embodiments, the hybrid drill bit 12 and the hybrid hole-opener 14 may be used along certain sections of the wellbore 28 in order to provide, for example, a borehole that has a gradually diminishing diameter from the top down.

In the illustrated embodiment, the system 10 includes a bottom hole assembly 32 with both the hybrid drill bit 12 and the hybrid hole-opener 14. However, it should be noted other embodiments of the system 10 may include just the hybrid drill bit 12 (without a hole-opener), in order to advance a wellbore where smooth edges and/or enlargement of the wellbore is not desired. In other embodiments, the system 10 may include just the hybrid hole-opener 14 (without a drill bit) on the BHA 32, in order to shape or enlarge a previously formed wellbore. In further embodiments, the system 10 may include the hybrid drill bit 12 with a traditional (only mechanical) hole-opener to drill the wellbore, or the system 10 may include a traditional (only mechanical) drill bit with the hybrid hole-opener 14 to drill the wellbore.

The BHA 32 may include different types of sensors that may collect measurements of the formation 20 surrounding the BHA 32 generally, as well as measurements relating to the operation of drilling equipment (e.g., hybrid drill bit 12, hybrid hole-opener 14). In certain embodiments, the BHA 32 may include a control unit (not shown) coupled to the sensors that receives and stores measurements from the sensors, processes the measurements, and/or transmits those measurements to a different control unit. One or more of these control units may receive the measurements collected via downhole sensors of the BHA 32 and perform an engineering analysis based on these measurements to adjust the operation of the hybrid drill bit 12 and/or the hybrid hole-opener 14 while the system 10 is drilling the wellbore 28.

The tools and sensors of the BHA 32 may be communicably coupled to a telemetry system. The telemetry system may itself include a control unit (not shown) and may transfer measurements and signals from the BHA 32 to a surface control unit 46 and/or to receive commands from the surface control unit 46. The telemetry system may include a mud pulse telemetry system, an acoustic telemetry system, a wired communications system, a wireless communications system, or any other type of communications system that would be appreciated by one of ordinary skill in the art in view of this disclosure. In certain embodiments, some or all of the measurements taken at the BHA 32 may also be stored for later retrieval at the surface.

In certain embodiments, the surface control unit 46 may provide additional functionality not available at control units within the wellbore 28, such as a keyboard and monitor that allow a user at the surface to interact with the surface control unit 46. The surface control unit 46 may be communicably coupled to the BHA 32 to receive measurements and signals from the BHA 32 and/or transmit commands to the BHA 32. Due to the lack of size constraints at the surface, the surface control unit 46 may typically have greater processing capability than the control units located downhole.

As mentioned above, the presently disclosed drilling system may include one or more controllers or control units designed to control the respective amount of energy being used to advance the wellbore 28 via the mechanical cutters (e.g., 34, 40) and via the laser cutting mechanisms (e.g., 36, 42) of a given hybrid drilling component (e.g., drill bit 12, hole-opener 14). The controller may receive sensor signals or general initial parameters based on the desired well to be drilled and a basic knowledge of the subterranean formation. These initial parameters may be determined during a planning phase, before the well is drilled. Using these initial parameters, the controller may perform a comprehensive engineering analysis to choose an appropriate drilling mechanism applicable for the well to be drilled. This comprehensive engineering analysis may be applied during the planning phases as well as during an ongoing drilling operation using real-time data received by sensors.

Figure 2:
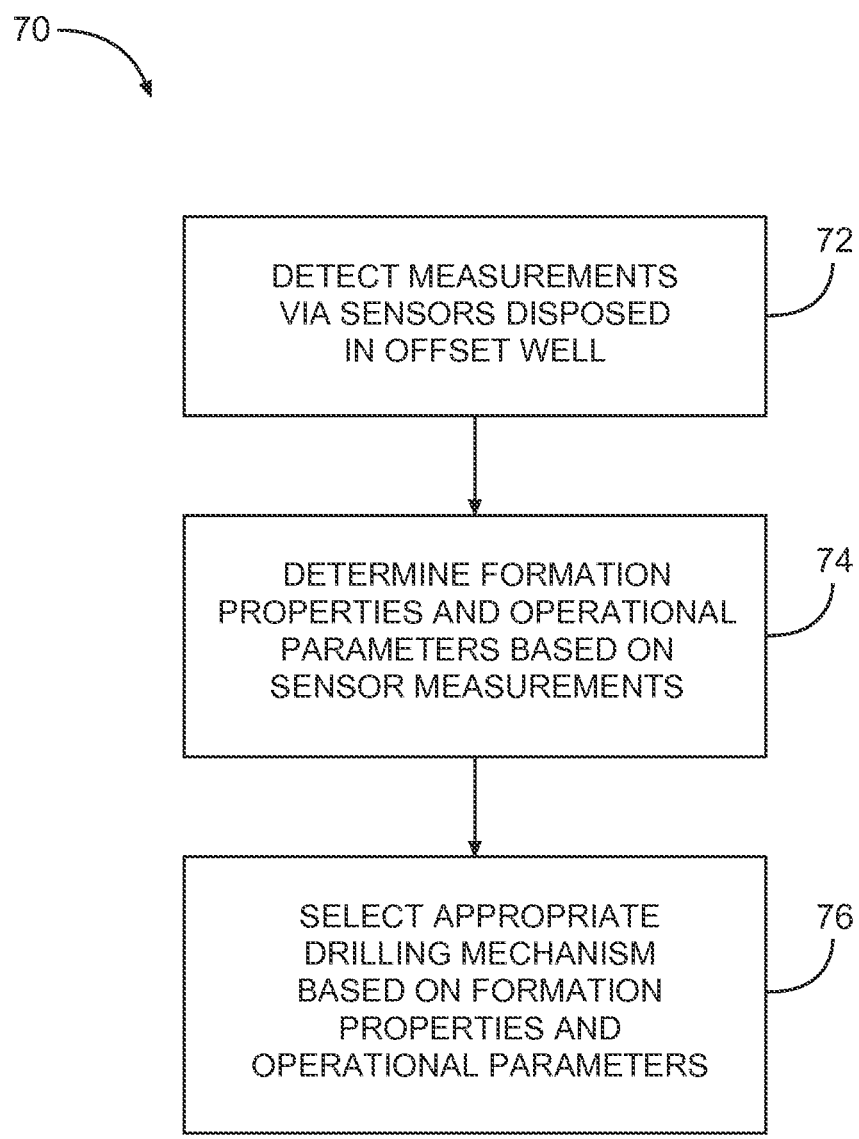
FIG. 2 is a process flow diagram illustrating a method for planning how to advance a wellbore using a laser-mechanical drilling assembly, in accordance with an embodiment of the present disclosure.

To that end, FIG. 2 illustrates a method 70 for choosing an appropriate drilling mechanism for drilling a desired wellbore. In some embodiments, the method 70 may include detecting (block 72) one or more measurements via sensors disposed in an offset well that is separate from the wellbore to be drilled or enlarged. These measurements may be indicative of the type, material, orientation, thickness, porosity, or any other desirable property of the formations that were drilled through in the offset well. The term "offset well" refers to a wellbore that is already formed near to where the new wellbore will be drilled. Thus, information regarding the offset well formations may indicate formation properties that are similar to those that will be encountered while drilling the new well. In some embodiments, the sensors may be lowered into this offset well after the well has been formed via a wireline, slickline, or coiled tubing. In other embodiments, the sensors may be lowered into the offset well to collect the data during drilling via any number of logging while drilling (LWD) and measuring while drilling (MWD) tools.

The method 70 may also include determining (block 74) one or more formation properties of the offset well as well as operational parameters for drilling the offset well, based on the sensor measurements. Such formation properties and operational parameters may include, for example, a formation log developed based on sensor measurements, bit performance, rate of penetration (ROP), weight on bit (WOB), and mechanical specific energy (MSE). The MSE may be determined based on a known relationship between the ROP, WOB, and other parameters. These formation properties and operational parameters may be derived from the offset well data available using any desirable methods.

The method 70 includes selecting (block 76) an appropriate drilling mechanism for drilling the wellbore, based on the determined formation properties and operational parameters. In addition, the method 70 may include selecting the drilling mechanism based on the type of wellbore to be drilled (e.g., monobore, variable borehole, or conventional). The appropriate drilling mechanism may include one or more conventional and laser drilling mechanisms that are expected to improve the life of the drill bit and/or hole-opener. For example, the data from the offset well may indicate that the formation to be drilled will be particularly severe on a conventional (fully mechanical) drill bit. Accordingly, the appropriate drilling mechanism for this type of formation may be the hybrid drill bit 12 discussed above with reference to FIG. 1, which utilizes energy from the laser cutting mechanism to supplement the mechanical cutters. As another example, if a particular formation has caused severe bit wear that resulted in an additional trip to change the drill bit used to drill the offset well, it may be desirable to utilize a laser hybrid drill bit to improve drilling performance. In such a situation, the mechanical cutters of the hybrid drill bit may guide the gauge of the drill string while the laser aids in providing additional energy to drill downhole.

Figure 3:
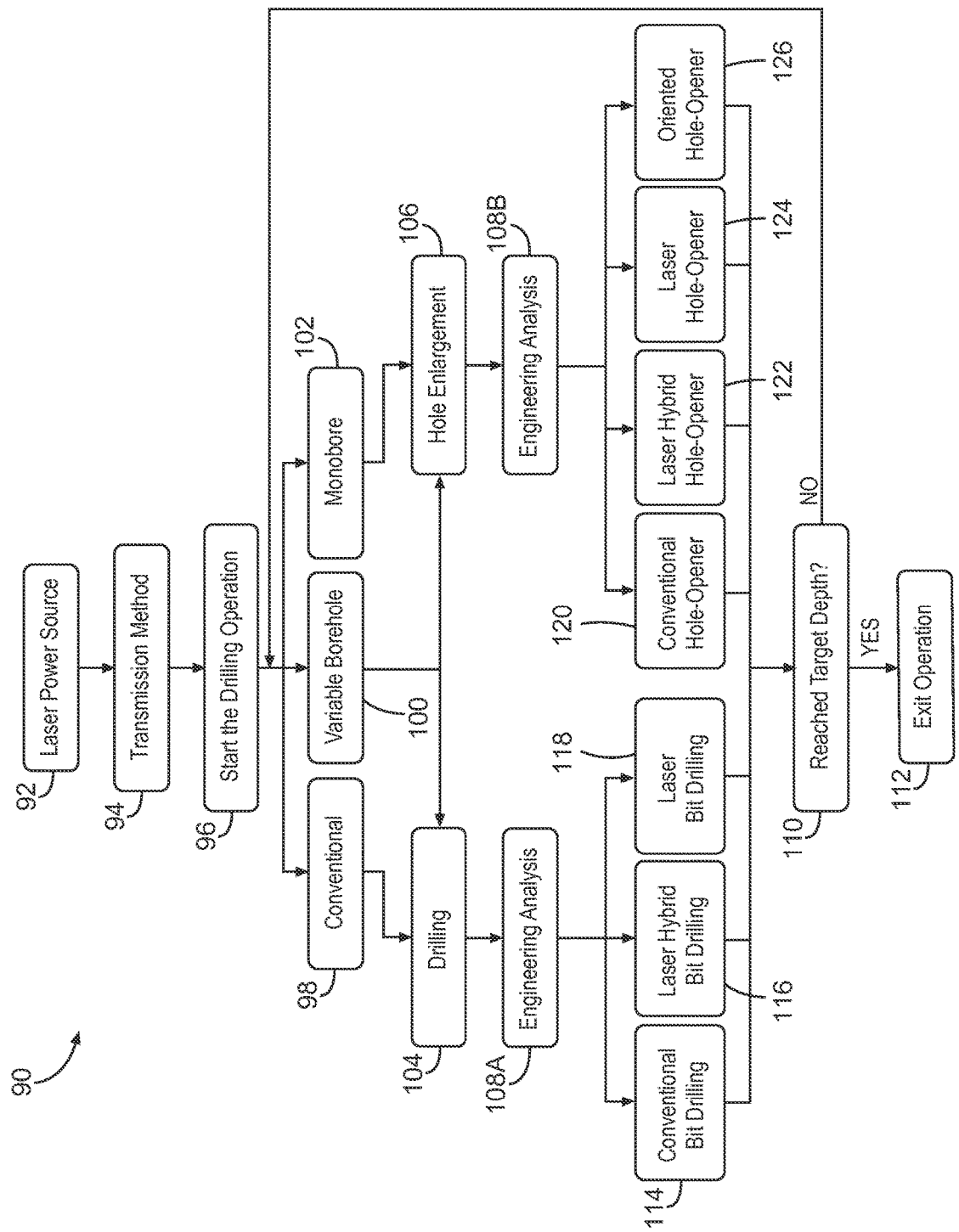
FIG. 3 is a process flow diagram illustrating a method for advancing a wellbore using a laser-mechanical drilling assembly, in accordance with an embodiment of the present disclosure.

Accordingly, using these planned drilling conditions, a comprehensive engineering analysis may be performed with respect to the depth and type of formation of the offset well to decide the most appropriate drilling mechanism. During the actual drilling operation, real-time data may be collected and used to update the engineering analysis on a continuous basis to further decide if the drilling mechanism selected during planning is appropriate for the drilling activity or if a change in drilling mechanism is desirable. To illustrate this drilling process, FIG. 3 shows a method 90 for operating a drilling system having a hybrid drill bit and/or a hybrid hole-opener.

The method 90 includes providing a laser power source 92 and a transmission method 94 for transmitting laser power from the laser power source 92 (e.g., power source 44 of FIG. 1) to the downhole laser cutting mechanisms on the drill bit and the hole-opener. Once this power transmission method is established, the method 90 may include starting the drilling operation 96. As illustrated, the drilling operation 96 may be performed in one of several different types of well environments. For example, the drilling operation 96 may be performed to form a conventional wellbore 98, a variable borehole 100, or a monobore 102. A conventional wellbore 98 may be a wellbore that is initially drilled at a desired inner diameter into the subterranean formation. A variable borehole 100 may refer to a wellbore having different diameters along the length of the wellbore. A monobore 102, as mentioned above, may include a wellbore that is the same diameter along a length of the wellbore.

As discussed above, the type of drilling mechanism may be initially selected during a planning stage to correspond with the desired type of well to be drilled. Accordingly, if the drilling operation 96 is used to form a conventional wellbore 98, the drilling mechanism used may be limited to the hybrid drill bit used to perform drilling 104. In other embodiments, the hybrid hole-opener may also be used to perform hole enlargement in the conventional welbore 98. In some embodiments, if the drilling operation 96 is used to form a monobore 102, the drilling mechanism used may be limited to a hybrid hole-opener used to perform hole enlargement 106. However, in other embodiments the hybrid drill bit may also be used to perform drilling 104 to form the monobore 102. In still further embodiments, if the drilling operation 96 is used to form a variable borehole 100, the drilling mechanisms used may include one or both of the hybrid drill bit and the hybrid hole-opener to perform drilling 104 and/or hole enlargement 106. Indeed, any desired combination of hybrid drill bits, hybrid hole-openers, and purely mechanical bits/hole-openers may be used to form any type of wellbore being drilled.

It should be noted that the drilling operation 96 may switch between forming a conventional wellbore 98, variable borehole 100, and monobore 102 at different points throughout the drilling process. Accordingly, it may be desirable to switch between the different drilling and hole-enlargement operations throughout the process as well. Utilizing a drilling system equipped with both the hybrid drill bit and the hybrid hole-opener (as shown in FIG. 1) may enable greater flexibility in switching between these operations while the system is downhole.

Upon determining whether the drilling operation 96 will involve drilling 104 via the hybrid drill bit, hole enlargement 106 via the hybrid hole-opener, or both, one or more engineering analyses 108 may be performed. For example, a controller may perform an engineering analysis 108A for determining how to operate the hybrid drill bit, and/or an engineering analysis 108B for determining how to operate the hybrid hole-opener. Based on the engineering analyses 108, the controller may adjust the operation of the hybrid drill bit and/or hybrid hole-opener to improve the overall efficiency of the drilling process.

The method 90 may include adjusting the operation of the hybrid drill bit and/or the hybrid hole-opener, as described at length below. Then the method 90 may include determining (block 110) whether a target depth has been reached. If the target depth has not been reached, the method 90 may include returning to the drilling operation 96 and repeating the calculations and engineering analysis 108. Upon reaching the target depth, the system may exit (block 112) the drilling operation.

To perform the engineering analysis 108, a particular section of the well may be analyzed to provide feedback on the drilling process. The well section may be analyzed according to the type of hole section to be drilled (e.g., conventional, variable, or monobore). This is shown through the two different types of engineering analyses 108A and 108B that may be performed to evaluate the wellbore section. In some embodiments, the length of the section to be analyzed may be chosen as every joint of pipe of approximately 30 feet. In other embodiments, the length of the section to be analyzed may be chosen as every 100 feet of the hole section or any other length appropriate for the engineering analysis. Thus, every time the drill string passes the selected length of the section of wellbore to be analyzed, real-time measurements taken via sensors downhole and/or at the surface may be analyzed through the engineering analyses 108 to determine whether changes to operation of the hybrid drilling components is desired.

The controller may perform one or more engineering analyses 108 at these points in the drilling process to determine how to operate the hybrid drill bit and/or the hybrid hole-opener. For example, as illustrated, based on the engineering analysis 108A, the controller may output control signals to the hybrid drill bit to operate the hybrid drill bit to perform conventional bit drilling 114, laser hybrid bit drilling 116, or laser drilling 118. Conventional bit drilling 114 refers to utilizing only the mechanical energy from the mechanical cutters of the hybrid drill bit to advance the wellbore. When operated in this mode, the hybrid drill bit may not receive any power to operate the laser cutting mechanism. Laser hybrid bit drilling 116 refers to utilizing a combination of mechanical energy from the mechanical cutters and laser energy output via the laser cutting mechanism to cut into the formation and advance the wellbore. Laser drilling 118 refers to utilizing only the laser energy supplied from the surface (or from a downhole power source) to cut into the formation and advance the wellbore. When operated in this mode, the hybrid drill bit may not mechanically contact the formation via the mechanical cutters of the bit.

Based on the engineering analysis 108B, the controller may output control signals to the hybrid hole-opener to perform as a conventional hole-opener 120, a laser hybrid hole-opener 122, a laser hole-opener 124, and/or an oriented hole-opener 126. The conventional hole-opener 120 refers to an operating mode in which the hybrid hole-opener utilizes only the mechanical energy from the mechanical cutters to enlarge the wellbore. When operated in this mode, the hybrid hole-opener may not receive any power to operate the laser cutting mechanism. The laser hybrid hole-opener 122 refers to an operating mode in which the hybrid hole-opener utilizes a combination of mechanical energy from the mechanical cutters and laser energy output via the laser cutting mechanism to enlarge the wellbore. The laser hole-opener 124 refers to an operating mode in which the hybrid hole-opener utilizes only the laser energy supplied from the surface (or from a downhole power source) to cut into the formation and enlarge the wellbore. When operated in this mode, the hybrid hole-opener may not mechanically contact the walls of the wellbore via the mechanical cutters of the hole-opener. The oriented hole-opener 126 refers to an operating mode in which the hybrid hole-opener is operated at an orientation offset from the axis of the wellbore or is operated to enlarge only a specific portion or side of the wellbore. In some embodiments, the hybrid hole-opener may be operated as the oriented hole-opener 126 along with any of the other three operating modes (e.g., 120, 122, and 124).

Again, a controller in the drilling system may perform the desired engineering analysis 108 to determine how to operate the hybrid drilling equipment to form the desired wellbore. The specific engineering analyses 108 that may be performed are described in detail below. The objective of this engineering analysis 108 may be to maximize the drilling efficiency of the system while minimizing the cost to improve the overall drilling performance. For example, although operating the laser cutting mechanisms may help maintain the life of the mechanical cutters throughout the drilling process, the operation of such laser components may be relatively expensive. This is because the laser cutting mechanism may involve relatively complicated systems that may require large amounts of power to operate. Throughout the drilling operation 96, sensors and control units may be used to monitor the mechanical specific energy (MSE) of the drilling process on a continuous basis as a measure of drilling efficiency. As described in greater detail below, the MSE is generally related to the amount of energy required per unit volume of rock being drilled.

As mentioned above, the engineering analysis 108A may be used to determine whether to operate the hybrid drill bit to perform conventional bit drilling 114, laser hybrid bit drilling 116, or laser drilling 118. As drilling progresses, the continuous engineering analysis 108A may determine that the mode of operation of the drill bit, or the relative amount of laser energy output via the laser cutting mechanism compared to the mechanical energy output via the mechanical cutters, should be adjusted.

For example, if the hybrid drill bit is initially controlled to operate as a conventional drill bit, then the engineering analysis 108 may indicate that a change in operation of the hybrid drill bit is needed to maintain the life of the bit while downhole. That is, as drilling progresses, the drill bit teeth may wear out, thereby reducing the efficiency and increasing the mechanical specific energy (MSE). In such a situation, the downhole lasers may be utilized to aid in the drilling activity to improve the overall efficiency. It should be noted that an increase in MSE may occur due to other downhole variables, and these increases in MSE may also warrant additional utilization of lasers to drill the upcoming hole section. Hence, by a judicious selection of monitored formation and drilling parameters, and by using MSE as an underlying criterion, a combination of conventional and laser drilling can be used to achieve an optimum performance of the hybrid drill bit. Drilling efficiency may improve significantly by using a combination of both these mechanisms (mechanical and laser). Similar methods of performing the engineering analysis 108B may be used to determine an appropriate operating mode of the hybrid hole-opener as well.

In other instances, it may be desirable to adjust the operation of the hybrid drill bit and/or hybrid hole-opener based on a change in the formation being drilled through. For example, in some embodiments, the drilling system may be used to drill through several formations that have substantially varying properties from one layer or rock to another. One operating mode of the hybrid drill bit, such as conventional bit drilling 114, may be particularly suited to one layer of rock but not to another. Accordingly, as the formation parameters change, sensors in the BHA may measure the parameters and provide them to the controller performing the engineering analysis 108A. The engineering analysis 108A may be used to determine an appropriate adjustment to the operation of the hybrid drill bit in response to the detected changes in formation properties. Thus, several different formations can be drilled via the drilling system in a single trip using an appropriate combination of mechanical and laser drilling mechanisms, as determined via the engineering analysis 108A based on real-time sensor feedback. This may enable the drilling system to drill deeper in a single trip or operation by effectively using lasers along with the conventional drilling method.

Figure 4:
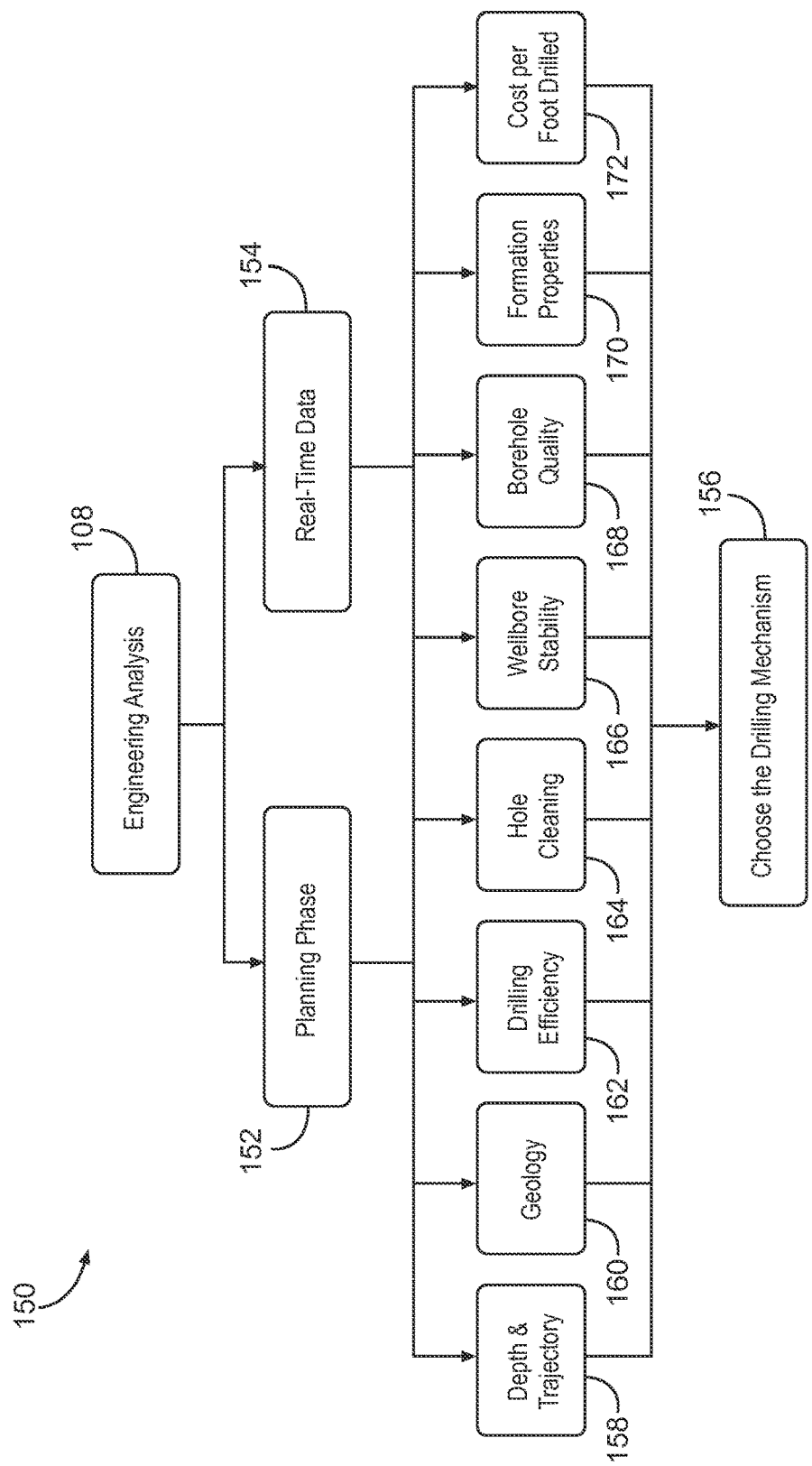
FIG. 4 is a process flow diagram illustrating a method for choosing an appropriate laser-mechanical drilling mechanism for advancing a wellbore, in accordance with an embodiment of the present disclosure.

FIG. 4 illustrates a method 150 for performing the engineering analysis 108 described above during drilling operations to determine a desired operating mode (or ratio of mechanical energy output to laser energy output) of the hybrid drilling component. As illustrated, the method 150 may include applying the engineering analysis using parameters collected or derived during a planning phase 152 and using continuously collected real-time data 154. For example, the planning phase data may be utilized in the engineering analysis to determine an initial drilling mechanism, as discussed above. After this, real-time data 154 may be used to perform engineering calculations to determine the desired mechanism to drill the next section of the wellbore. This may yield a more efficient and cost effective drilling process designed based on the needs of the next section to be drilled. In some embodiments, the approach of using the engineering analysis for each section of the well may help improve the resulting wellbore quality overall and prevent mechanical failures of bits and other components. In this manner, the disclosed hybrid drilling system may yield more efficient and higher quality drilling than is available through existing systems that use a single operating mode, a single mechanism for cutting into the formation, or a single relationship between energy output via the laser cutting components and mechanical components.

Some of the underlying variables that may play a role in choosing the appropriate drilling mechanism 156 based on the engineering analysis 108 for a given set of conditions are illustrated in FIG. 4. These variables may include, for example, a depth/trajectory 158 of the wellbore, geology 160 of the formation, a drilling efficiency 162, a hole cleaning property 164, wellbore stability 166, a borehole quality 168, formation properties 170, and a cost per foot drilled 172.

It should be noted that a portion of, or all of, the variables listed may be used in the engineering analysis 108 to determine the desired drilling mechanism 156. In addition, other variables that are not listed in FIG. 4 may be utilized in the engineering analysis 108 to choose the appropriate drilling mechanism 156, in addition to or in lieu of those listed. The chosen drilling mechanism 156 may refer to the combination of hybrid drill bit and hybrid hole-opener desired for a specific drilling process, as well as the mode of operation of the hybrid drill bit and/or hybrid hole-opener. It should be noted that the specific engineering analysis 108 used to choose the operational mode of the hybrid drill bit may be different from the engineering analysis 108 used to choose the operational mode of the hybrid hole-opener.

One or more of the variables relating to depth/trajectory 158 of the wellbore may include the current depth of the wellbore at any point in the drilling process, the total desired depth of the wellbore as determined during the planning phase 152, an orientation of the wellbore, and any other variables relating to the path design for the wellbore. Variables relating to the geology 160 of the formation may include, for example, a type of rock or shale through which the system is drilling or is expected to drill. Variables relating to the drilling efficiency 162 may include, for example, MSE and other specific energy calculations, as discussed in detail below.

Variables relating to the hole cleaning properties 164 may include parameters representative of the amount of cuttings that are present in the wellbore during or after drilling. For example, it may be desirable to utilize the laser cutting mechanisms to melt or otherwise remove undesirable cuttings from a portion of the annulus. When a large amount of cuttings are detected, the engineering analysis 108 may determine that the appropriate drilling mechanism should utilize lasers to aid the mechanical cutters in breaking down and reducing the amount of cuttings.

Variables relating to the wellbore stability 166 may include parameters representative of the material, permeability, and instability of certain shale formations through which the well is drilled. Variables relating to the borehole quality 168 may include measurements indicative of the profile of the wellbore walls. For example, the borehole quality 168 may generally represent the smoothness of the wellbore, based on a number or size of undulations detected in the wellbore wall. Particularly in hole enlargement operations such as drilling monobores to maximize production through the wellbore, it may be desirable to introduce the laser cutting mechanism into the process to help smooth the edges of the enlarged wellbore. When the borehole quality 168 indicates that the wellbore being drilled through a formation is not particularly smooth, the engineering analysis 108 may determine that the appropriate drilling mechanism should utilize lasers to aid the mechanical cutters.

Variables relating to the formation properties 170 may include measurements taken by MWD or LWD tool components, and other downhole sensors. These sensed formation measurements may include, but are not limited to, resistivity measurements, porosity measurements, gamma ray measurements, pressure measurements, and measurements of the composition of formation fluids. Such formation properties 170 may relate closely with the geology variables 160 described above, and the two may be used to determine more complex variables, such as the locations of strata boundaries in the formation among other things. When the formation properties 170 indicate that the wellbore is being drilled through a very hard or very tight formation, the engineering analysis 108 may determine that the appropriate drilling mechanism utilizes lasers to aid the mechanical cutters in breaking through the formation. However, when the formation properties 170 indicate that the wellbore is being drilled through a soft formation, the engineering analysis 108 may determine that the appropriate drilling mechanism only utilizes the conventional mechanical cutters to break through the formation.

As noted above, the cost per foot drilled 172 may be another relatively important factor in choosing the appropriate drilling mechanism 156. This cost per foot drilled 172 may represent an incremental cost of using downhole laser components for drilling. For example, a particular drilling activity may warrant the use of the laser cutting mechanisms in combination with conventional mechanical cutters to achieve a maximum drilling efficiency (e.g., MSE). However, the incremental cost 172 of using the downhole lasers may outweigh the gain achieved by improving the drilling efficiency of the process. Thus, the comprehensive engineering analysis 108 that also accounts for the drilling cost per foot drilled 172 should be performed to select the appropriate drilling mechanism 156. In some embodiments, the engineering analysis 108 may determine that no laser power should be used to improve drilling efficiency due to the increased cost. However, in other embodiments, the engineering analysis 108 may be used to effectively adjust the laser power in these drilling scenarios to achieve the maximum performance.

Different combinations of conventional and laser mechanisms may be used to improve the drilling efficiency and minimize cost of drilling a desired wellbore based on a combination of the different variables (e.g., 158-172) used in the engineering analysis 108. For example, a conventional and laser hybrid hole-opener may be controlled to operate with a desired combination of mechanical energy and laser energy provided to the formation, in order to drill a better gauged wellbore. If the borehole quality 168 and/or a high wellbore tortuosity (based on depth and trajectory 158) is a problem in any particular hole section due to the formation type (e.g., 170), an appropriate combination of conventional and laser hole-openers can be used to improve the borehole quality 168.

The drilling efficiency of the hybrid drill bit or hybrid hole-opener may be calculated based on an energy balance. This energy balance, for example, may be determined based on the mechanical specific energy (MSE) of the mechanical cutters, a wellbore profile energy, a hydro-mechanical specific energy (HMSE), a laser specific energy (LSE) or curve specific energy of the laser cutting mechanisms, a laser-mechanical-wellbore energy, or a combination of two or more of these energies. For example, in some embodiments, the engineering analysis 108 may rely on an overall drilling efficiency determined by a combination of MSE and LSE or a combination of HMSE and LSE. These various specific energies and energy balance may be determined according to the following expressions.

Equation 1 below shows a calculation of MSE that may be part of the engineering analysis 108. In the equation, WOB represents the weight on bit, as measured via a load cell or some other force sensors disposed along the drilling system. The term $A_b$ represents the area of the bit that is contacting the formation throughout the drilling process. The term N represents a rotational speed of the bit and the term T represents the torque at the bit, which may be detected via a torque sensor. The term ROP represents the rate of penetration of the drill bit through the formation, which may be monitored via position or velocity sensors.

$$MSE = \frac{WOB}{A_b} + \frac{120\pi NT}{A_b ROP} \quad (1)$$

A more inclusive version of the mechanical specific energy is the HMSE that takes into account the hydraulic component of energy. Equation 2 below represents a calculation of HMSE that may be part of the engineering analysis 108. Several of the variables in equation 2 are similar to those discussed above with reference to the first equation. In equation 2, the term $WOB_e$ represents the effective weight on bit after accounting for the hydraulics. The term $\eta$ is a dummy factor for energy reduction. The term $F_j$ represents the force due to nozzle jets at the drill bit. The term $\Delta P_b$ represents a pressure drop across the bit, and Q represents a flow rate of drilling mud through the system.

$$HMSE = \frac{WOB_e}{A_b} + \frac{120\pi NT + 1154\eta \Delta P_b Q}{A_b ROP}; \quad (2)$$

where $WOB_e = WOB - \eta F_j$

Equation 3 below shows a calculation of LSE that may be part of the engineering analysis 108. To determine the overall efficiency of the drilling operation, the MSE or the HMSE described above may be combined with the LSE to yield a total input energy, as shown below in equations 4 and 5.

$$LSE = \frac{\text{Power Intensity} \times \text{Time}}{\text{Thermal Penetration Depth}} \quad (3)$$

$$\text{Total Input Energy} = MSE + LSE \quad (4)$$

$$\text{Total Input Energy} = HMSE + LSE \quad (5)$$

The engineering analysis 108 may use either one of the following equations 4 or 5, or combinations thereof, to determine the total energy input to the drilling system. To increase the drilling efficiency of the system, it may be desirable to minimize the total input energy used to advance the wellbore. Again, this efficiency may only be one part of the determination of which drilling mechanism to use or how much energy to apply to the mechanical components versus the laser components. The determination may also be based on formation properties, cost of drilling with the lasers, and any of the other variables described above.

Figure 5:
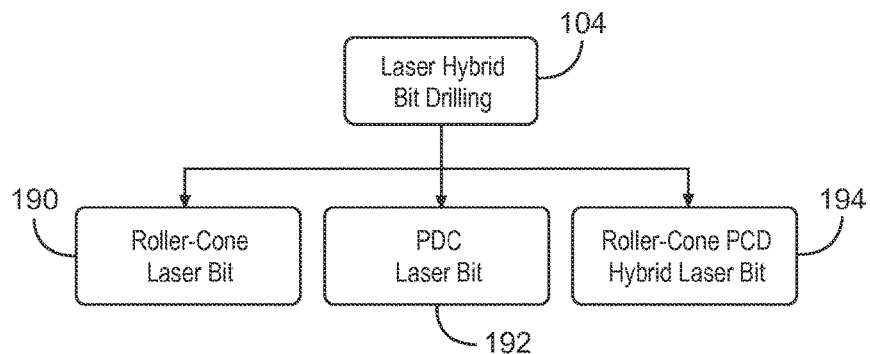
FIG. 5 is a process flow diagram illustrating available laser-mechanical hybrid drilling mechanisms, in accordance with an embodiment of the present disclosure.

The comprehensive engineering analysis 108 may be used during the planning phase 152 to determine whether hybrid drill bits, hybrid hole-openers, or both should be used to efficiently drill the desired wellbore. In embodiments where the engineering analysis 108 determines that a mechanical-laser hybrid drill bit is desired, the engineering analysis 108 may also be used to determine a desired type of hybrid drill bit for the process. FIG. 5 illustrates several different hybrid drill bits that may be chosen for drilling the wellbore.

It may be desirable to utilize the comprehensive engineering analysis described above to decide whether to use conventional bit drilling, laser drilling, or laser hybrid bit drilling to drill a particular section of the well. When laser hybrid bit drilling 104 is desired, different combinations of laser bits may be used to address the particular drilling demands. For example, the laser hybrid bit drilling 104 may be performed using a roller-cone laser bit 190, a fixed polycrystalline diamond compact (PDC) laser bit 192, or a roller-cone and PDC laser bit 194. The roller-cone laser bit 190 may include a drill bit that has at least one and up to any desirable number of roller cones designed to rotate with respect to a journal arm of the bit. These roller cones may include teeth that are designed to contact the formation to provide the mechanical drilling force, and the roller cones are designed to rotate in response to drilling mud being pumped through the bit. In addition, as described above, the roller-cone laser bit 190 may also include the laser cutting mechanism for focusing laser beams at the formation during drilling.

The PDC laser bit 192 may include a bit structure with no relative moving parts, and a surface of the PDC laser bit 192 designed to impact the formation may include PDC inserts used to break up the formation. The PDC laser bit 192 may also include the laser cutting mechanism for focusing laser beams at the formation during drilling. The roller-cone and PDC laser bit 194 may include a combination of both roller cones and PDC inserts (or some other type of insert) disposed on the outer surface of the roller cones, as well as the laser cutting mechanism.

Figure 6:
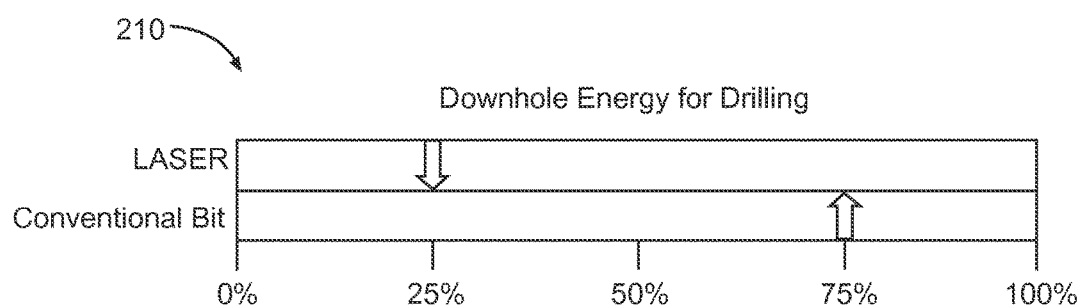
FIG. 6 is a graph illustrating an energy balance between a mechanical drilling mechanism and a laser drilling mechanism, in accordance with an embodiment of the present disclosure.
Figure 7:
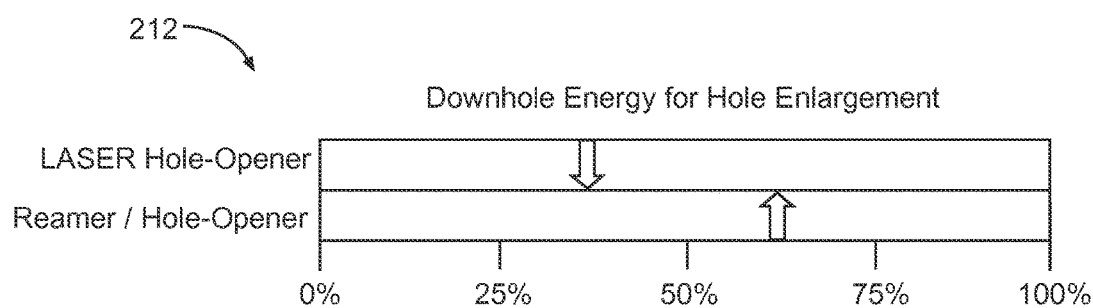
FIG. 7 is a graph illustrating another energy balance between a mechanical drilling mechanism and a laser drilling mechanism, in accordance with an embodiment of the present disclosure.

FIGS. 6 and 7 illustrate examples of a downhole energy distribution 210 for a drilling process and a downhole energy distribution 212 for a hole enlargement process. As illustrated in these figures, the hybrid drill bit and the hybrid hole-opener may each be designed to selectively output energy through a combination of both mechanical cutters and laser cutting mechanisms. The conventional (i.e., mechanical) portions of the drill bit may be used along with the laser cutting mechanisms, as shown in FIG. 6. Similarly, FIG. 7 shows that the conventional (i.e., mechanical) portions of the reamer or hole-opener may be used along with the laser cutting mechanisms.

In the drill bit downhole energy distribution 210, approximately 75% of the energy input to the hybrid drill bit is for operating the mechanical cutters, and approximately 25% of the energy input to the hybrid drill bit is for operating the laser cutting mechanism. In the hole-opener energy distribution 212, approximately 62.5% of the energy input to the hybrid hole-opener is for operating the mechanical cutters, and approximately 37.5% of the energy input to the hybrid drill bit is for operating the laser cutting mechanism. As shown in both figures, the amount of energy output to the formation from the mechanical portion may be larger than the amount of energy output to the formation from the laser portion of the hybrid drilling components. However, it should be noted that any distribution of energy into the mechanical cutters and/or the laser cutting mechanism may be applied. For example, in some embodiments the amounts of energy input to the different cutting components may include 100% mechanical energy, 100% laser energy, a greater mechanical energy input than laser energy input, or a greater laser energy input than mechanical energy input. By appropriately adjusting the downhole energy provided from each of the mechanical and laser components, based on a comprehensive engineering analysis, the controllable system may significantly improve the drilling efficiency and performance of the drilling system.

Although the present disclosure and its advantages have been described in detail, it should be understood that various changes, substitutions and alterations can be made herein without departing from the spirit and scope of the disclosure as defined by the following claims.

What is claimed is:

1. A system, comprising:
   a laser-mechanical hybrid drill bit, comprising:
      first mechanical cutters for selectively applying mechanical force to a subterranean formation to drill a wellbore through the subterranean formation; and
      a first laser cutting mechanism for selectively directing a first laser beam toward the subterranean formation to drill the wellbore;
   a laser-mechanical hybrid hole-opener, comprising:
      second mechanical cutters for selectively applying mechanical force to a wall of the wellbore through the subterranean formation to shape the wellbore; and
      a second laser cutting mechanism for selectively directing a second laser beam toward the wall to shape the wellbore;
   and a controller communicatively coupled to the laser-mechanical hybrid drill bit and the laser-mechanical hybrid hole-opener, wherein the controller is configured to perform an engineering analysis and to control the relative amounts of energy output to the subterranean formation by the first and second mechanical cutters and the first and second laser cutting mechanisms all at the same time based on the engineering analysis.

2. The system of claim 1, wherein the laser-mechanical hybrid drill bit comprises a roller-cone laser drill bit.

3. The system of claim 1, wherein the laser-mechanical hybrid drill bit comprises a fixed polycrystalline diamond compact (PDC) laser drill bit.

4. The system of claim 1, wherein the laser-mechanical hybrid drill bit comprises a roller-cone PDC hybrid laser drill bit.

5. The system of claim 1, wherein:
the laser-mechanical hybrid drill bit is operable in a mechanical mode where the first mechanical cutters alone are used to drill the wellbore, a hybrid mode where both the first mechanical cutters and the first laser cutting mechanism are used to drill the wellbore, and a laser mode where the first laser cutting mechanism alone is used to drill the wellbore;
the laser-mechanical hybrid hole-opener is operable in a mechanical mode where the second mechanical cutters alone are used to shape the wellbore, a hybrid mode where both the second mechanical cutters and the second laser cutting mechanism are used to shape the wellbore, and a laser mode where the second laser cutting mechanism alone is used to shape the wellbore; and
the controller is communicatively coupled to the laser-mechanical hybrid drill bit and to the laser-mechanical hybrid hole-opener to control operation of each of the laser-mechanical hybrid drill bit and the laser-mechanical hybrid drill bit in the mechanical mode, the hybrid mode, or the laser mode.

6. The system of claim 1, further comprising one or more sensors communicatively coupled to the controller for measuring real time properties of the subterranean formation, real-time properties of the drilling operation, or both, wherein the drilling operation includes operation of both the laser-mechanical hybrid drill bit and the laser-mechanical hybrid hole-opener, wherein the controller is configured to perform the engineering analysis based on the properties of the subterranean formation, the real-time properties of the drilling operation, or both.

7. The system of claim 1, wherein the controller controls the relative amount of energy output to the subterranean formation from the first and second mechanical cutters and from the first and second laser cutting mechanism such that an efficiency of a drilling operation is maximized based on a calculated total input energy of the drilling operation, wherein the drilling operation includes operation of both the laser-mechanical hybrid drill bit and the laser-mechanical hybrid hole-opener.

8. A method, comprising:
performing a drilling operation via a system comprising a laser-mechanical hybrid drill bit and a laser-mechanical hybrid hole-opener to advance a wellbore through a subterranean formation,
wherein the laser-mechanical hybrid drill bit comprises:
first mechanical cutters for selectively applying mechanical force to a subterranean formation to drill a wellbore through the subterranean formation; and
a first laser cutting mechanism for selectively directing a laser beam toward the subterranean formation to drill the wellbore;

wherein the laser-mechanical hybrid hole-opener comprises:
second mechanical cutters for selectively applying mechanical force to a wall of the wellbore through the subterranean formation to shape the wellbore; and
a second laser cutting mechanism for selectively directing a second laser beam toward the wall to shape the wellbore;
receiving data indicative of a formation property of a subterranean formation, a real-time property of the drilling operation, or both via a controller, wherein the drilling operation includes operation of both the laser-mechanical hybrid drill bit and the laser-mechanical hybrid hole-opener;
performing an engineering analysis of the data indicative of the formation property, the real-time property of the drilling operation, or both via the controller;
outputting a first one or more control signals to operate the first and second mechanical cutters to output an amount of mechanical energy from the first and second mechanical cutters based on the engineering analysis; and
outputting a second one or more control signals to a laser power source to operate the first and second laser cutting mechanisms to output an amount of laser energy from the first and second laser cutting mechanisms based on the engineering analysis; and
controlling a relative amount of energy output to the subterranean formation from the first and second mechanical cutters and from the first and second laser cutting mechanisms all at the same time based on the engineering analysis.

9. The method of claim 8, further comprising sensing the data indicative of the formation property, the real-time property of the drilling operation, or both via one or more sensors while advancing the wellbore, receiving the data indicative of the formation property from the one or more sensors, performing the engineering analysis, and outputting the first and second one or more control signals while advancing the wellbore.

10. The method of claim 8, further comprising detecting the formation property via one or more sensors disposed in an offset well separate from the wellbore prior to advancing the wellbore.

11. The method of claim 8, wherein the engineering analysis comprises determining a total drilling efficiency of the drilling operation based on at least two selected from the group consisting of: a mechanical specific energy; a hydro-mechanical specific energy; and a laser specific energy.

12. The method of claim 8, further comprising performing the engineering analysis based on a depth of the wellbore, a trajectory of the wellbore, a drilling efficiency, a hole-cleaning property, a wellbore stability property, a borehole quality, cost per foot drilled, or a combination thereof.

13. The method of claim 8, wherein the engineering analysis is based at least partially on a cost of operating the first and second laser cutting mechanisms per foot drilled by the mechanical-laser hybrid drilling drill bit and the mechanical-laser hybrid hole-opener.

14. The method of claim 8, further comprising outputting additional control signals via the controller to adjust the relative amount of mechanical energy output from the first and second mechanical cutters and the amount of laser energy output from the first and second laser cutting mechanisms.

15. The method of claim 8, further comprising controlling a relative amount of energy output to the subterranean formation from the first and second mechanical cutters and from the first and second laser cutting mechanism such that an efficiency of the drilling operation is maximized based on a calculated total input energy of the drilling operation.

16. The method of claim 8, wherein:
the laser-mechanical hybrid drill bit is operable in a mechanical mode where the first mechanical cutters alone are used to drill the wellbore, a hybrid mode where both the first mechanical cutters and the first laser cutting mechanism are used to drill the wellbore, and a laser mode where the first laser cutting mechanism alone is used to drill the wellbore;
the laser-mechanical hybrid hole-opener is operable in a mechanical mode where the second mechanical cutters alone are used to shape the wellbore, a hybrid mode where both the second mechanical cutters and the second laser cutting mechanism are used to shape the wellbore, and a laser mode where the second laser cutting mechanism alone is used to shape the wellbore; and
the controller is communicatively coupled to the laser-mechanical hybrid drill bit and to the laser-mechanical hybrid hole-opener to control operation of each of the laser-mechanical hybrid drill bit and the laser-mechanical hybrid drill bit in the mechanical mode, the hybrid mode, or the laser mode.

17. The method of claim 16, further comprising:
selecting a first mode of operation for the laser-mechanical hybrid drill bit from the mechanical mode, the hybrid mode, and the laser mode based on the engineering analysis;
selecting a second mode of operation for the laser-mechanical hybrid hole-opener from the mechanical mode, the hybrid mode, and the laser mode based on the engineering analysis; and
outputting the first and second one or more signals to operate the laser-mechanical hybrid drill bit in the selected first mode of operation and to operate the laser-mechanical hybrid hole-opener in the selected second mode of operation.

18. The method of claim 8, further comprising monitoring a mechanical specific energy of the drilling operation on an ongoing basis via the controller based on the data indicative of the formation property of the subterranean formation, the real-time property of the drilling operation, or both received via the controller.

19. The method of claim 8, further comprising outputting the first and second one or more control signals to adjust an operation of the mechanical-laser hybrid drill bit and/or the mechanical-laser hybrid hole-opener based on a detected change in the subterranean formation through which the drilling operation is performed.

* * * * *